3,410,814
METHOD OF PRODUCING MOULDING MATERIALS BY REACTING MELAMINE AND FORMALDEHYDE AND COMPOUNDING THE RESULTANT RESIN WITH CELLULOSE IN THE PRESENCE OF PHTHALIC UREIDE
Vadim Nickolaevich Gorbunov, Modest Sergeevich Akutin, and Grigory Vasiljevich Sagalaev, Moscow, and Isaak Jakovlevich Faidel, Alexandr Dmitrievich Sokolov, Inga Nickolaevna Aleinikova, Boris Alexandrovich Preobrazhensky, and Roman Fedorovich Chernyshev, Orekhovo-Zuevo, U.S.S.R., assignors to Nauchno-Issledovatelsky Institute Plasticheskikh Mass., Moscow, U.S.S.R.
No Drawing. Filed Nov. 19, 1964, Ser. No. 412,307
7 Claims. (Cl. 260—17.3)

ABSTRACT OF THE DISCLOSURE

A method of producing molding material from a resin produced by condensing melamine and formaldehyde at a temperature of 100 to 160° C. and a pressure of 5 to 20 atm. until the content of the methylol groups in the resin equals 2 to 13% by weight. The resin thus obtained is partially dried, whereupon it is subjected to compounding with cellulose at a temperature of 40 to 90° C. and in the presence of phthalic monoureide as a catalyst. The molding material obtained is thereafter dried and milled.

---

The present invention relates to a method of producing melamine-formaldehyde molding materials.

A method is known for the production of melamine-formaldehyde molding materials which comprises mixing melamine and formalin and carrying out condensation thereof at a temperature not exceeding 80° C. and at normal pressure in an alkaline medium over a period of several hours. The thus formed resin is mixed with cellulose and additives at a temperature of 30°–40° C. and is then dried and milled.

This method has a number of disadvantages. Nearly all stages of the manufacturing process are batch operations, which makes control and automation difficult. Batch cooking of resins in comparatively large volumes leads to localized overheating and variations in the composition and properties of the resins. Many of the manufacturing steps, such as cooking, mixing and drying require manual labor and are accompanied by the formation of noxious gases and dust.

The long duration of batch operations necessitates increased volume and weight of equipment and involves greater power consumption for mixing and milling, which, in the long run, results in increased operating costs.

In addition, recovery of free formaldehyde and formaldehyde formed during the reaction, as well as the recovery of methyl alcohol, are difficult.

It is an object of the present invention to provide a continuous method of producing molding materials.

It is another object of the invention to provide a method involving a reduction in the overall time required for a complete cycle of the process and an improvement in the quality of the finished product.

In accordance with the above objects, the method of the present invention comprises effecting melamine-formaldehyde condensation at a temperature of 100° to 160° C. and a pressure of 5 to 20 atm. The condensation should proceed until the content of methylol groups amounts to 2 to 13%. The resinous product obtained by the condensation is partially dried and compounded with a filler and with additives. The compounding is performed in the presence of a catalyst producing an acid reaction at a temperature of 40° to 90° C., after which the product is dried and milled. The catalyst employed is phthalic monoureide.

For a better understanding of the invention by those skilled in the art the following example is given by way of illustration.

Example 75 kg. of melamine and 135 kg. of formalin which have been neutralized to a pH of 7.9–8.4 are charged by means of a batcher into the upper section of a cylindrical apparatus provided with an agitator and a filtering bottom element. As the melamine passes through the apparatus which is heated to 80°–90° C., it dissolves in the formalin within 15 min. The formed solution is filtered and passed by means of a batching pump into a heated tubular reactor where condensation proceeds for 5 min. at a temperature of 120°–140° C. and a pressure of 10 atm. until the content of methylol groups in the condensation product does not exceed 13%. The moisture contained in the resin thus formed is continuously partially removed, also in a tubular apparatus and the resin is thereafter compounded with cellulose and additives—titanium dioxide and zinc stearate. Compounding is carried out in the presence of phthalic monoureide as catalyst at a temperature of 70° C.

The amount of cellulose is 75%, that of phthalic monoureide 0.1–0.2%, that of titanium dioxide 0.2–4% and that of zinc stearate 0.4% of the weight of the original melamine.

The uniformly mixed mass is dried at 105°–180° C. and is then milled.

The formaldehyde and methyl alcohol contained in the condensation product formed during partial drying of the resin are utilized.

A pilot-scale embodiment of the process described herein revealed the following technical and economical advantages: The time required for a complete cycle is reduced several fold, particularly during the stages of producing the resin, compounding the resin with filler, and drying.

There is a great reduction in the metal requirement for equipment and likewise of floor space requirement, a considerable reduction in operating personnel and a substantial saving in power consumption as a result of the elimination of lengthy mixing of large volumes of resinous mass. Resin losses during the process are considerably reduced. As a result of mechanization and partial automation of production, the homogeneity and quality of the molding material are greatly improved.

What is claimed is:

1. A continuous method of producing melamine-formaldehyde molding materials, said method comprising preparing a melamine-formaldehyde resin containing from 2 to 13 wt. percent of methylol groups by condensing melamine and formaldehyde at a pressure of 5 to 20 atm. and a temperature of 100 to 160° C.; compounding the resin with cellulose at a temperature of 40 to 90° C. in the presence of phthalic monoureide as catalyst and an additive selected from the group consisting of zinc stearate and titanium dioxide, followed by drying and milling the obtained moulding compound.

2. A method according to claim 1 comprising pre-drying the resin before compounding same with cellulose to partially remove the moisture contained in the resin and formaldehyde.

3. A method according to claim 1, wherein condensation is effected at a temperature of 120–140° C. and a pressure of 10 atm., and compounding is effected at a temperature of about 70° C.

4. A method according to claim 3, wherein the resin is compounded with 75% by weight of cellulose, based on the weight of melamine.

5. A method according to claim 4, wherein the amount of phthalic monoureide is 0.1–0.2% by weight, based on the weight of melamine.

6. A method according to claim 5, wherein the amounts of zinc stearate and titanium dioxide are respectively 0.4% and 0.2–4% by weight, based on the weight of melamine.

7. A method according to claim 1, wherein the molding compound is dried at a temperature of 105–180° C.

References Cited

UNITED STATES PATENTS

| | | | |
|---|---|---|---|
| 2,255,901 | 9/1941 | Schroy | 91—70 |
| 2,640,041 | 5/1953 | Bruner et al. | 260—29.4 |
| 2,830,035 | 4/1958 | Renner et al. | 260—67.6 |
| 2,937,966 | 5/1960 | Updegraff et al. | 154—43 |

WILLIAM H. SHORT, *Primary Examiner.*

H. SCHAIN, *Assistant Examiner.*